June 7, 1955  H. K. WONG  2,710,335
LIGHT DIFFUSING AND SOUND ABSORBING UNIT
Filed Dec. 30, 1952  3 Sheets-Sheet 1

INVENTOR.
Herbert K. Wong
BY Lippincott & Smith
ATTORNEYS

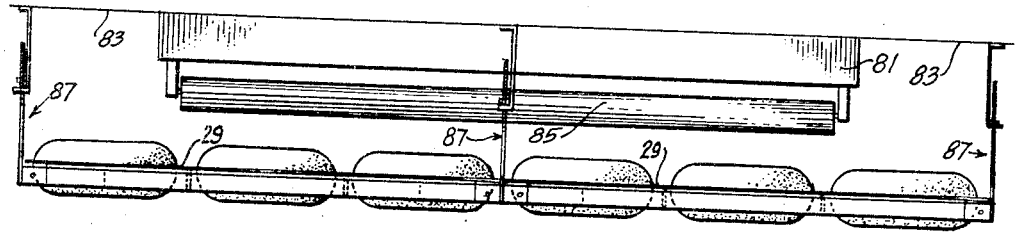
Fig. 10.
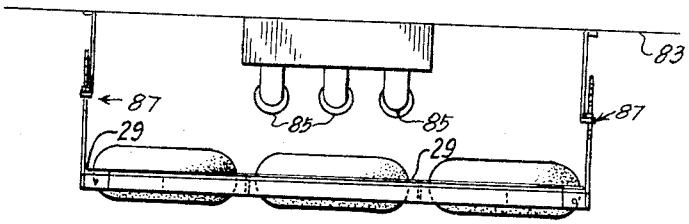
Fig. 11.
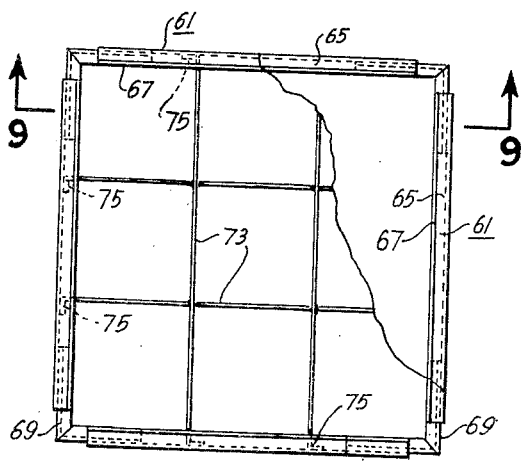
Fig. 8.
Fig. 9.
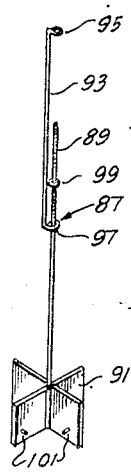
Fig. 12.
INVENTOR.
Herbert K. Wong
BY
Lippincott & Smith
ATTORNEYS

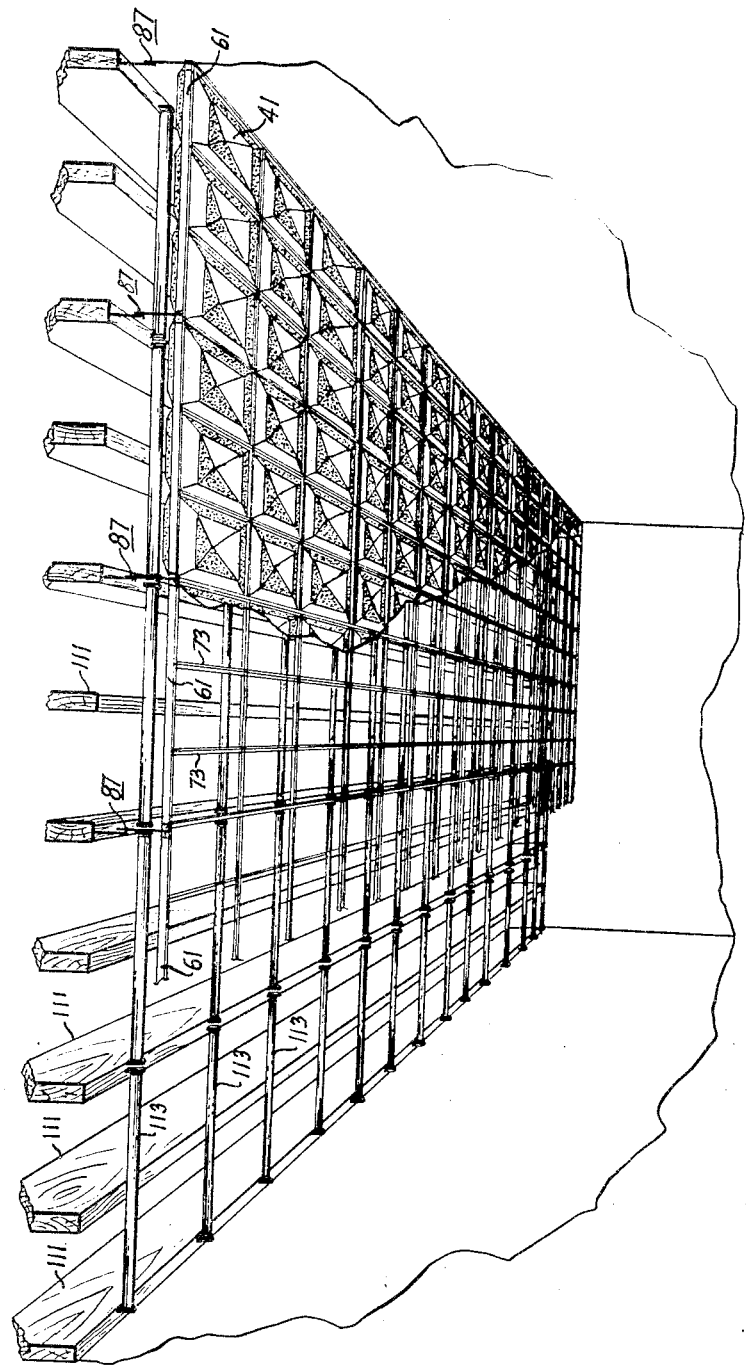

United States Patent Office 2,710,335
Patented June 7, 1955

2,710,335

LIGHT DIFFUSING AND SOUND ABSORBING UNIT

Herbert K. Wong, San Francisco, Calif., assignor to Cepco, Inc., San Francisco, Calif., a corporation of California Application December 30, 1952, Serial No. 328,717

11 Claims. (Cl. 240—9)

The present invention relates in general to modular or panel lighting fixtures and more specifically to luminous panels comprised of at least a pair of oppositely disposed membranous sheets or films perimetrically secured or bonded together and centrally displaced in the manner of peripherally clamped diaphragms to define a closed gas containing chamber. Such panels may be geometrically patterned, each forming a plurality of cells contiguously related or each sheet or film may be corrugated to define a single light diffusing panel. The panels are adapted for location beneath existing light sources, preferably of the elongated tubular character, or for assembly as entire luminous ceilings provided with light sources dispersed above the panels comprising such ceilings.

In the development of the illuminating art the advantages of high illumination levels, to enable details to be seen, low intrinsic intensity of the illuminant, to avoid glare and fatigue, and wide distribution of the luminous source, to avoid both discrete shadows and reflected glare have long been recognized as necessary for eye comfort.

Entire luminous ceilings have been built, using louvers to direct the light and hide the source and direct glare therefrom from most of the ordinary angles of view. Such ceilings, however, are not completely effective in preventing reflected glare from papers or desk surfaces, they are heavy and expensive, and they require a completely finished and (frequently) an acoustically treated ceiling above them.

The present invention extends the art one step further by eliminating reflected glare while providing numerous other advantages and features hereinafter to be set forth. The invention contemplates a luminous ceiling constructed of modular units in the form of the luminous panels as outlined, such panels being particularly adapted to serve as the ceiling per se, the light source therefor being conveniently suspended from main building construction members such as floor joists, thus eliminating conventional ceiling structures heretofore necessary while providing ultra-modern architectural designs.

Among the features presented by a luminous ceiling in accordance with the present invention is high intensity illumination with relatively low source brightness; effective control of the brightness ratio and elimination of reflected glare; and flexibility of design for architectural styling with such ceilings accommodating irregularly shaped rooms through modular unit facilities.

Numerous advantages not necessarily self-evident are presented by the light diffusing panel per se as constructed in accordance with the present invention. Suitable versatile material for forming the membranous sheets may be selected from among the various plastics, the selection being guided by such factors as color stability, satisfactory aging characteristics, susceptibility to stamping, embossing and painting, cost, and moisture and chemical resistance. Commercially available vinylchloride acetate optimally offers such characteristics and has been successfully employed in the type panels herein described. To insure an effective light transmitting panel, the upper membranous sheet or film is preferably transparent and the lower membrane is translucent thus providing for light diffusion. Also, for reasons next to be set forth, the lower membrane may be flexible or elastic and the upper membrane somewhat stiffer. Generically speaking the panels are of semi-rigid material (i. e.) having sufficient stiffness as to sustain themselves substantially flat when peripherally supported. However, it should be stressed that although desirable, these qualifications are not in any way requirements, as for example, panels constructed of translucent membranes of substantially uniform stiffness offer excellent characteristics for the purposes of the present invention. Also, it should be realized that if the top panel is constructed to have poor light transmission characteristics at high frequencies, a substantial portion of the ultra-violet light produced by the source is eliminated. However, again this is an added feature as contrasted with a requirement.

The light diffusing panels of the present invention are adapted to be assembled as a ceiling or beneath an existing light source through the employment of frames which may conveniently comprise intersecting T-shaped or flanged members adapted to receive or otherwise locate the panels in contiguous relation. Owing to the extreme lightness inherent in the panels of the present invention (a typical two-foot square panel may weigh less than 10 ounces) and also to the absence of stressing forces occasioned by the panels, the supporting frame may be constructed of extremely fine gauge metals weighing as little as 20% of conventional louver-type frames, or even lighter weight extruded plastic frames will suffice to provide suitable supporting means. The mutually intersecting cross members provided in the frame assemblies locate the individual panels or so-called cells of the panels leaving effectively a pair of membranous diaphragms exposed in each frame interstice. In the case of corrugated panels perimetrically deployed frames will suffice, the bonded or otherwise secured edges of the panels forming sufficiently rigid structures as to support easily the panel.

Other features of the present invention should now be apparent, it having long been known that non-rigid diaphragms have important sound absorbing qualities. The trapped air volumes disposed between the geometrically patterned diaphragms provide mediums wherein sound can pursue multiple absorbing and reflecting paths, thus acoustically yielding highly damped resonant chambers in the form of light diffusing panels. Accordingly, the present invention in the form of a room ceiling provides an illumination and acoustic treatment for a fraction of the cost of conventional ceilings.

Diaphragmatic damping is particularly effective in the lower sound frequency range depending upon the mass reactance and mechanical stiffness of the panel and the reactance of the trapped air with the air reactance mainly determining the maximum absorbing frequency patterns. Dispersive centers for sound are considered a valuable corrective feature for diffusing the sound pattern, and the acoustic luminous panel of the present invention optimally offers this characteristic through the panel supplying its own dispersion centers because of its non-symmetrical absorbing characteristics. As sounds in general are represented by widely variable frequencies, the multiple diffusing and absorbing centers are continually changing and the sound is diffused for liveliness and simultaneously absorbed.

With the foregoing in mind, among the objects of the present invention are the following: the provision of efficient light diffusing panels weighing only a fraction of conventional louver-type lighting fixtures; the provision of light diffusing panels adapted for application with existing lights or as luminous ceilings; the provision of light diffusing panels easily and quickly installable in modular units within light weight frames and which offer no skewing forces to such frames; the provision of panels admitting of inexpensive luminous and acoustic ceiling treatments; the provision of a complete ceiling which, by its lightness, permits the construction of a lighter and hence more economical building, and the provision of a ceiling structure which not only acts as an acoustic treatment of the room wherein it is installed but also as sound insulation between such room and a floor above.

Other objects and advantages of the present invention will be apparent to those skilled in the art from a reading of the following detailed description thereof as interpreted in the light of the accompanying drawings wherein:

Fig. 8 shows in plan suitable frame or support means for the panels of Figs. 1 through 6;

Fig. 9 is a view in cross section of the frame of Fig. 8;

Fig. 10 is a view in side elevation of an existing light source provided with luminous panels in accordance with the present invention;

Fig. 11 shows the structure of Fig. 10 as viewed in end elevation;

Fig. 12 is a perspective view of a typical hanger suitable for suspending the panel frames; and, Fig. 13 is a view in perspective of a portion of a room having a ceiling constructed in accordance with the present invention, the assembly thereof being progressively represented from left to right.

Referring now to Figs. 1 through 6, there is shown various views of three differently geometrically patterned panels within the contemplation of the present invention, such configurations having different sound frequency characteristics and noise reduction coefficients and all essentially capable of providing light diffusion giving the appearance of light sources in the form of luminous panels.

Figure 1:
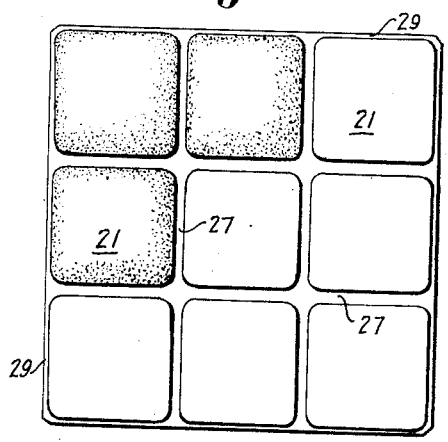
Fig. 1 shows in plan a geometrically patterned panel constructed in accordance with the present invention.
Figure 2:
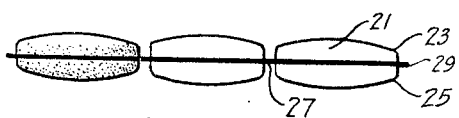
Fig. 2 is a view in side elevation of the panel of Fig. 1.

The panel shown in Figs. 1 and 2 may be descriptively referred to as the "dome" type panel. In the illustrated form of invention as shown in Fig. 1, nine domes generally represented at 21, mutually contiguously related, comprise a single panel, it of course being realized that no particular significance attaches to the number of domes constituting a given panel. The panel represented in Figs. 1 and 2 is initially formed from a pair of membranous sheets or films 23 and 25 of plastic, suitably heated and pressed in an embossing mold. The so-pressed membranes 23 and 25 are then secured together perimetrically insofar as the individual domes 21 are concerned, as, for example, through heat and pressure bonding, dielectric welding or by solvent or adhesive bonding to form mutually intersecting reinforcing ribs 27 and panel edges 29. Each dome forms an air containing chamber and each dome maye be regarded as a panel per se.

As has been mentioned, excellent vibrational damping characteristics are imparted to the panels of Figs. 1 and 2 by utilizing a somewhat more flexible membrane 25 on the bottom of the panel and a relatively stiffer membrane 25 on the bottom of the panel and a relatively stiffer membrane 23 on the top thereof. At least one of the membranes 23 and 25 is translucent rather than transparent, in order to provide for the light diffusing properties. If the lower membrane is made translucent, then the upper membrane 23 may also be translucent, or for greater light transmission through the panel, the member 23 may be transparent. In either case, the domes 21 form air chambers or dead-air spaces, thus providing multiple light and sound reflecting and absorbing paths throughout the panel.

The diaphragms individually are of sheet material the stiffness of which is roughly comparable to a heavy manila wrapping paper or a light Bristol board. For obvious reasons it is preferable that they be non-inflammable, or at least non-flame-supporting. Various plastics have the required characteristics those now preferred being vinyl plastics incorporating sufficient pigment to give the desired light diffusion, or the sheets having a "ground" surface for the same purpose.

Figure 3:
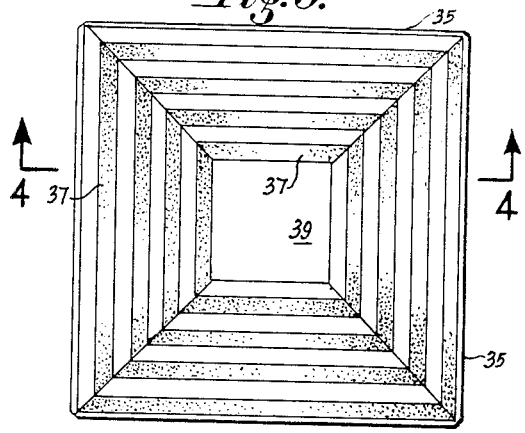
Fig. 3 is a view in plan of a modified panel constructed in accordance with the principles of the present invention.
Figure 4:
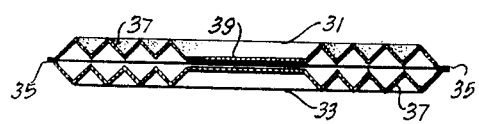
Fig. 4 is a view in cross section of the panel of Fig. 3.

The embodiment of the invention shown in Figs. 3 and 4 differs from the panel previously described in that the upper diaphragm 31 and the lower diaphragm 33 are merely perimetrically bonded or secured together with the doubled edges thereof generally indicated at 35 forming rigid supporting surfaces for the panel. Thus the diaphragms 31 and 33 form a single fluidtight chamber adapted to serve as an air trap. The diaphragms 31 and 33 are fabricated in like manner to the diaphragms 23 and 25 of the panel of Figs. 1 and 2 with the exception that a corrugated mold is employed in lieu of the domed embossing mold heretofore mentioned. The corrugations 37 so produced are disposed outwardly from a depressed central portion 39 and comprise integral stiffening means for the panel. The panel of Figs. 3 and 4 offers the advantage of the panel of Figs. 1 and 2 of simplicity in construction insofar as bonding is concerned while at the same time presenting a panel sufficiently rigid as to require only edge support. However, the noise reduction coefficient and general over-all frequency response presented by the panel of Figs. 1 and 2 is somewhat greater than that of the panel of Figs. 3 and 4; the use of the latter type of panel is indicated where that first described would deaden the response of the room too severely. It should be mentioned, however, that the panels are interchangeable in their respectively recited applications in providing generally the advantages hereinbefore enumerated over fixtures heretofore known.

Figure 5:
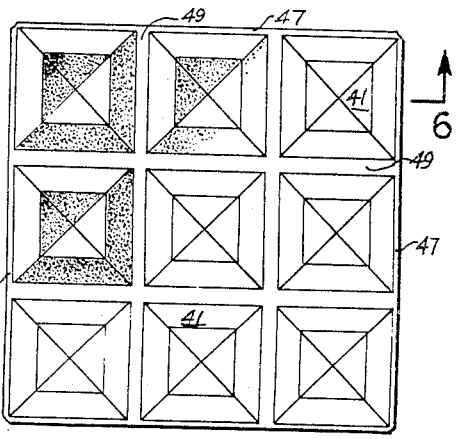
Fig. 5 shows in plan a further modified type panel constructed in accordance with the present invention.
Figure 6:
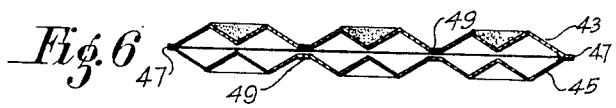
Fig. 6 is a view in cross section of the panel of Fig. 5.

Figs. 5 and 6 represent a further modification of a light diffusing panel constructed in accordance with the principles hereinbefore described and having characteristics intermediate the dome and corrugated type panels. The panel of Figs. 5 and 6 may be descriptively referred to as the "pyramid" type being provided, as in the case of dome type panels, with nine pyramids generally designated at 41. The pyramid type panel resembles the corruggated type panel in that the upper geometrically patterned diaphragm 43 is merely perimetrically bonded to the lower geometrically patterned diaphragm 45, thus providing reinforced supporting edges 47. However, as in the case of the dome type panel, the diaphragms 43 and 45 are pressed in a multiple embossing mold, thus providing contiguously related pyramids 41 having mutually intersecting strengtheners or ribs 49 therebetween. However, the ribs of the upper and lower diaphragms are not bonded together and accordingly the pyramid panel defines a single large air chamber in the manner of the corrugated panel.

Figure 7:
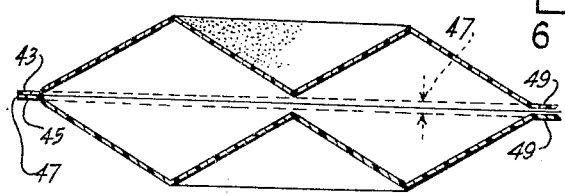
Fig. 7 is a detailed view of the panel of Fig. 6.

It should be mentioned that the thickness of the membranous or plastic sheets comprising the panel diaphragms may be of the order of 0.01 inch and accordingly this dimension appears exaggerated in the drawings. Fig. 7 shows, in greatly exaggerated detail, the left hand portion of the panel of Figs. 5 and 6, the bonded edge 47 thereof comprising extreme portions of the upper diaphragm 43 and lower diaphragm 45, with the spacing between the diaphragms in the region of the ribs 49 being apparent. Thus it may be seen that the pyramids 41 form a plurality of individual air cells mutually interconnected to comprise a single large chamber hermetically sealed.

Suitable frame means for the dome, corrugated and pyramid type panels is shown in Figs. 8 and 9, such frame means being of the modular type admitting of pre-fabrication for installation beneath existing light sources or in a ceiling arrangement adapted to accommodate rooms of various sizes and shapes. The edges members 61 are conveniently of L-shape in section, the stem 63 of the L being directed downwardly and the horizontal flange portion 65 extending inwardly of the box-like configuration. Each of the edges 61 is provided with a vertical flange 67 extending upwardly from the horizontally flanged portion 65 to provide support means for the bonded edges of the panels. The edges 61 are joined by corner members 69 each provided with upwardly extending openings 71 in their lower edges. If the frame is constructed of metal the corner members may be spot welded to the edge members, or if the frame is of plastic, suitable bonding techniques may be employed.

The frame as now described is suitable for supporting panels of the corrugated type, the doubled edges 35 of the panel abutting the vertical flanges 67 to provide perimetrical support with the corrugations 37 lending the necessary rigidity to the panel. For supporting the dome and pyramid type panels, it is desirable to employ mutually intersecting strips 73 respectively fastened within the box-like configuration of Fig. 8 through end flanges 75, spot welded to the edge members 61, the strips 73 are then adapted to abut the intersecting ribs 27 of the dome panel, or ribs 49 of the pyramid panel with the edges of the respective panels adapted to abut the vertical flanges 67 in the manner of the corrugated panel. Normally the spacing between adjacent strips is sufficiently great as to eliminate conventional "louver action" and accordingly the frame and panel cooperation is confined to the locating arrangement afforded by the strips in matching the panel intersecting strengtheners or ribs to effect rapid installation and positive orientation, bearing in mind the fact that such a mutually cooperative arrangement is possible because the panels offer no measurable stresses to cause frame skew.

One simple application of the invention, as now described, is shown in Figs. 10 and 11 wherein a pair of panels of the dome type are located beneath an existing light source to diffuse the light passing downwardly into the room. The fixture 81 may be of conventional character supported from a ceiling 83 and having a plurality of tubular lamps 85 depending therefrom. A pair of frames in accordance with that shown in Figs. 8 and 9 is adapted to be suspended beneath the lamps 85 by hangers generally designated at 87 and shown in detail in Fig. 12.

The hangers 87 are comprised of an elongated body member 89 provided with threads along the upper portion thereof and having a crossed member 91 fixed to the lower end thereof. A stem 93 is provided with a pair of eyelets 95 and 97 respectively located on the ends thereof with the eyelet 95, adapted for attachment to the ceiling 83 and the eyelet 97, being movable along the body member 89. A nut 99 threadably engages the upper portion of the body member 89 to provide abutting engagement with the eyelet 97 and hence permit adjustment in the overall length of the hanger. The crossed member 91 is suitably provided with projections or lugs 101 adapted to engage the corners of a frame, the lugs 101 being seated within the openings 71 thereof (Fig. 9). Accordingly, the hangers provide a convenient means of securing one frame to another and suspending the frame structure at a uniform distance from the ceiling. After the frames have been installed, the dome type panel is merely rested on top of the box-like frames to provide the light diffusing function.

A further application of the invention is illustrated in Fig. 13 wherein panels of the pyramid type are employed as a luminous ceiling, the various steps in the luminousacoustic treatment being illustrated from left to right in this figure. In the upper portion of the figure, there is shown a plurality of main building members herein represented as floor joists 111 between which there is secured a plurality of tubular lamps 113 of conventional character, preferably although not necessarily uniformly dispersed and of sufficient number as to provide the required room illumination. Next, and as is represented in the middle portion of Fig. 13, there is secured to the floor joists 111 a plurality of hangers 87 in accordance with the hanger described and shown in Fig. 12. Suitable frames, preferably equipped with the strips 73 (Fig. 8) for the pyramid type panels, are suspended by the hangers any desired distance beneath the light sources. With the frames in position, the panels are merely rested thereon in the manner hereinbefore explained, the lower pyramids 41 thereof being visible to occupants of the room to present an ultra-modern architectural styling appearance while at the same time both providing an entire luminous ceiling of inexpensive character and serving to reduce the noise level within the room.

One advantage of the structure which has not previously been mentioned is that when the panels are used in a location where moths or other insects, attracted by the light, are entrapped above them the insects do not cast discrete shadows to give the installation an unsightly appearance. Hence less frequent cleaning is required, and when cleaning is necessary the lightness of the panels makes it quick and easy and therefore inexpensive.

What is claimed is:

1. A light-diffusing and sound-absorbing unit for use in connection with a light source, comprising a supporting frame adapted for mounting in front of said source and a panel edge-supported by said frame and comprising a pair of freely and independently vibratile diaphragms of light-transmitting material, at least one whereof is light-diffusing, said diaphragms having edges in contact and the major portions of the surfaces thereof spaced apart to form an air chamber therebetween which modifies the acoustic response of said diaphragms through the acoustic reactance of the entrapped air.

2. A light-diffusing and sound-absorbing unit for use in connection with a light source, comprising a supporting frame adapted for mounting in front of said source and a panel edge supported by said frame and comprising an acoustically yielding diaphragm of light-transmitting material embossed so that a major portion thereof lies out of the plane of its edges, and a second acoustically yielding diaphragm of light-transmitting material of like peripheral dimensions mounted with its edges in contact with said first mentioned diaphragm to form therewith an air-entrapping dampened resonant chamber, at least one of said diaphragms being light diffusing.

3. A light-diffusing and sound-absorbing unit for use in connection with a light source, comprising a supporting frame adapted for mounting in front of said source and a panel edge supported by said frame and comprising an acoustically yielding diaphragm of light-transmitting material embossed so that a major portion thereof lies out of the plane of its edges, and a second acoustically yielding diaphragm of light-transmitting material of like peripheral dimensions mounted with its edges in contact with said first mentioned diaphragm to form therewith an air-entrapping damped-resonant chamber, the diaphragm more remote from said light source being of light-diffusing material.

4. A light-diffusing and sound-absorbing unit for use in connection with a light source comprising a supporting frame adapted for mounting in front of said source and a panel edge supported by said frame and comprising a pair of acoustically yielding diaphragms outwardly embossed with respect to each other to form a chamber entrapping air therebetween, both of said diaphragms being free to vibrate and at least one being light-diffusing.

5. A unit as defined in claim 4 wherein each of said diaphragms is similarly embossed with ridges extending into said chamber to subdivide said chamber into a plurality of subsidiary cells.

6. A unit as defined in claim 5 wherein said ridges meet within said chamber to form cells which are substantially independent of each other.

7. A light-diffusing and sound-absorbing unit for use in connection with a light source comprising a supporting frame adapted for mounting in front of said source and a panel edge-supported by said frame and comprising an acoustically yielding diaphragm of light-transmitting sheet material, the major portion whereof is embossed out of its original plane to form a plurality of adjacent flattened domes, and a second acoustically yielding diaphragm of light-transmitting material covering said first mentioned diaphragm and in contact therewith in the portions between said domes to form within each dome an independent air cell both sides of which are free to vibrate, at least one of said diaphragms being light-diffusing.

8. A light-diffusing and sound-absorbing unit as defined in claim 7 wherein both of said diaphragms are similarly embossed outwardly of each other to form air cells both walls whereof are flattened domes.

9. A sub-ceiling structure adapted for suspension beneath lighting units for simultaneously controlling the illumination and the acoustics of a room wherein it is installed, which comprises a frame of intersecting support members which divide said frame into modular units and have substantially horizontally projecting flanges thereon, and light-diffusing panels edge-supported on the flanges of said modular units, each panel comprising a pair of plastic-sheet acoustically yielding diaphragms, the major portions of said diaphragms being spaced apart to entrap air therebetween to form damped resonant chambers.

10. An illumination and sound-controlling structure for a room having lighting units mounted on the ceiling thereof, comprising a sub-ceiling including a supporting frame suspended below said ceiling and comprising intersecting support members dividing said sub-ceiling into modular panel areas, and translucent light-diffusing and sound-absorbing panels supported solely along their edges by said frame within said areas, said panels comprising a pair of superposed acoustically yielding diaphragms, the major portions of said diaphragms being spaced apart to form air chambers therebetween and being free to vibrate.

11. A light-diffusing and sound-absorbing unit adapted to be supported in front of a light source comprising a pair of superposed acoustically yielding light-transmitting diaphragms of like peripheral dimensions, at least one whereof is embossed outwardly with respect to the other to form an air cell therebetween and at least one whereof is light-diffusing, means for maintaining the edges of said diaphragms in contact so as to form a unitary panel, and means for supporting said panel by its edges in spaced relation to such light source with both diaphragms thereof free to vibrate in response to sound waves.

References Cited in the file of this patent

UNITED STATES PATENTS

| | | |
|---|---|---|
| 1,194,294 | Johanson | Aug. 8, 1916 |
| 1,288,124 | Muckenhirn | Dec. 17, 1918 |
| 1,870,241 | Dorey | Aug. 9, 1932 |
| 2,011,252 | Modigliani | Aug. 13, 1935 |
| 2,398,507 | Rolph | Apr. 16, 1946 |
| 2,410,744 | Powers | Nov. 5, 1946 |
| 2,659,807 | Wakefield | Nov. 17, 1953 |

FOREIGN PATENTS

| | | |
|---|---|---|
| 551,733 | Great Britain | Mar. 8, 1943 |
| 999,368 | France | Oct. 3, 1951 |

OTHER REFERENCES

Bulletin No. 59, "Plexiglas Design and Fabrication Data," published by Rohm and Haas Co., April 1948.

Article on "Lighting Fixtures as Big as the Room," from Rohm and Haas Reporter, pages 4 and 5. Published June 1949.